(12) United States Patent
Cheng et al.

(10) Patent No.: US 7,835,578 B2
(45) Date of Patent: Nov. 16, 2010

(54) AUTOMATED VIDEO-TO-TEXT SYSTEM

(75) Inventors: Hui Cheng, Bridgewater, NJ (US); Darren Butler, Philadelphia, PA (US)

(73) Assignee: Sarnoff Corporation, Princeton, NJ (US)

( * ) Notice: Subject to any disclaimer, the term of this patent is extended or adjusted under 35 U.S.C. 154(b) by 896 days.

(21) Appl. No.: 11/695,755

(22) Filed: Apr. 3, 2007

(65) Prior Publication Data

US 2007/0273696 A1    Nov. 29, 2007

Related U.S. Application Data

(60) Provisional application No. 60/793,044, filed on Apr. 19, 2006.

(51) Int. Cl.
*G06K 9/34* (2006.01)
(52) U.S. Cl. ............... 382/176; 382/171; 382/173; 382/243; 382/294; 358/462
(58) Field of Classification Search ............... 382/171, 382/173, 176, 164, 243, 294; 345/467, 418; 358/462; 715/523, 500.1, 517; 375/240.08
See application file for complete search history.

(56) References Cited

U.S. PATENT DOCUMENTS 2,912,674 A * 11/1959 Aiken .................. 340/944

| | | | |
|---|---|---|---|
| 6,931,604 B2 * | 8/2005 | Lane | 715/853 |
| 7,065,250 B1 * | 6/2006 | Lennon | 382/224 |
| 7,305,618 B2 * | 12/2007 | Jasinschi | 715/249 |
| 2004/0083092 A1 * | 4/2004 | Valles | 704/9 |
| 2006/0165169 A1 * | 7/2006 | Ng et al. | 375/240.12 |
| 2006/0242126 A1 * | 10/2006 | Fitzhugh | 707/3 |
| 2007/0156842 A1 * | 7/2007 | Vermeulen et al. | 709/217 |

OTHER PUBLICATIONS

Cheng et al., "Segmentation of Aerial Surveillance Video Using a Mixture of Experts," Proc. of Digital Image Computing: Techniques and Applications (DICTA) Conference, Cairns, Australia, Dec. 2005.
Cheng et al., "Multiscale Bayseian Segmentation Using a Trainable Context Model," IEEE Transactions on Image Processing, Apr. 2001, vol. 10, No. 4, pp. 511-525.

(Continued)

*Primary Examiner*—Samir A. ahmed
*Assistant Examiner*—Ali Bayat
(74) *Attorney, Agent, or Firm*—Lowenstein Sandler PC

(57) ABSTRACT

A method for transforming Video-To-Text is disclosed that automatically generates text descriptions of the content of a video. The present invention first segments an input video sequence according to predefined semantic classes using a Mixture-of-Experts blob segmentation algorithm. The resulting segmentation is coerced into a semantic concept graph and based on domain knowledge and a semantic concept hierarchy. Then, the initial semantic concept graph is summarized and pruned. Finally, according to the summarized semantic concept graph and its changes over time, text and/or speech descriptions are automatically generated using one of the three description schemes: key-frame, key-object and key-change descriptions.

24 Claims, 6 Drawing Sheets

OTHER PUBLICATIONS

Comaniciu et al., "Robust Analysis of Feature Spaces: Color Image Segmentation," in Proc. of IEEE Conf. on Computer Vision and Pattern. Recognition, San Juan, Puerto Rico, Jun. 1997, pp. 750-755.

Comaniciu et al., "Mean shift: a robust approach toward feature space analysis," IEEE Trans. on Pattern Analysis and Machine Intelligence, vol. 24, No. 5, pp. 603-619, May 2002.

Zhao et al., "Real-Time Wide Area Multi-Camera Stereo Tracking," CVPR (1) 2005: 976-983.

Tao et al., "Object Tracking with Bayesian Estimation of Dynamic Layer Representations," IEEE Trans. Pattern Anal. Mach. Intell. 24(1): 75-89 (2002).

\* cited by examiner

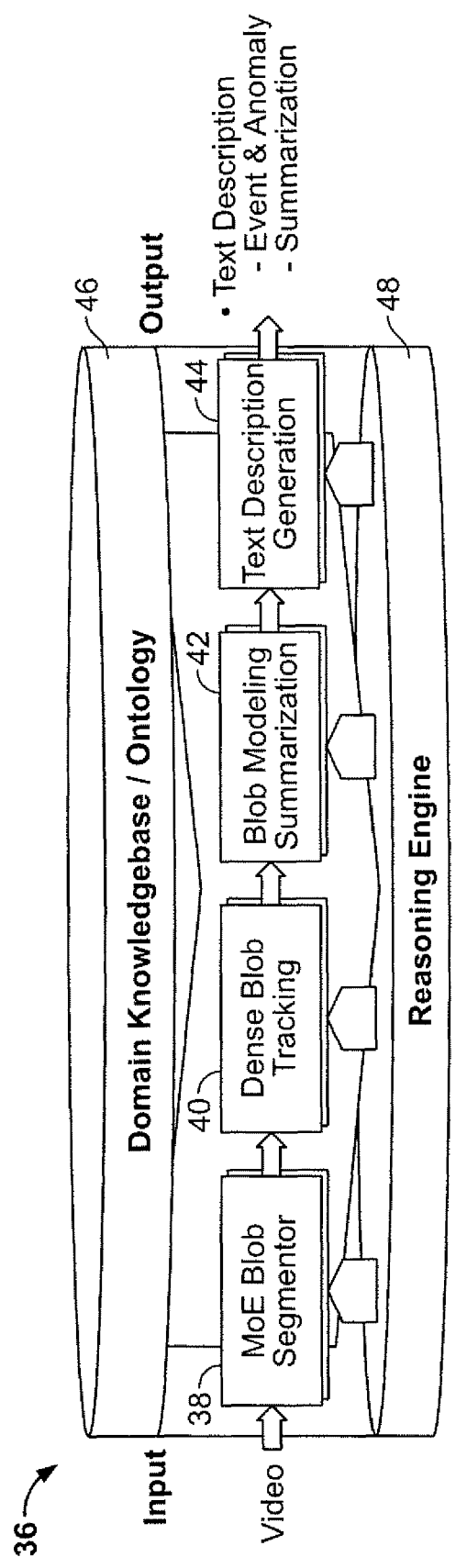
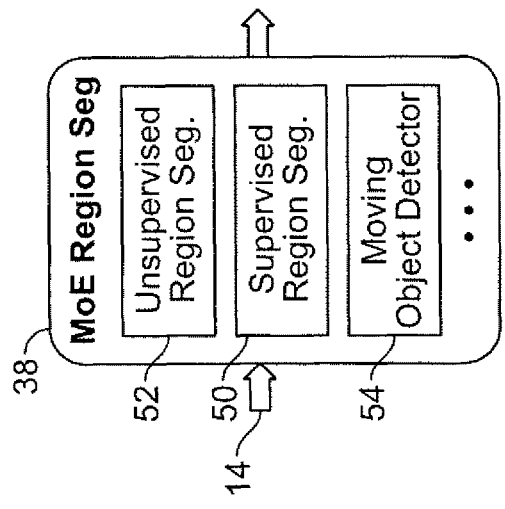

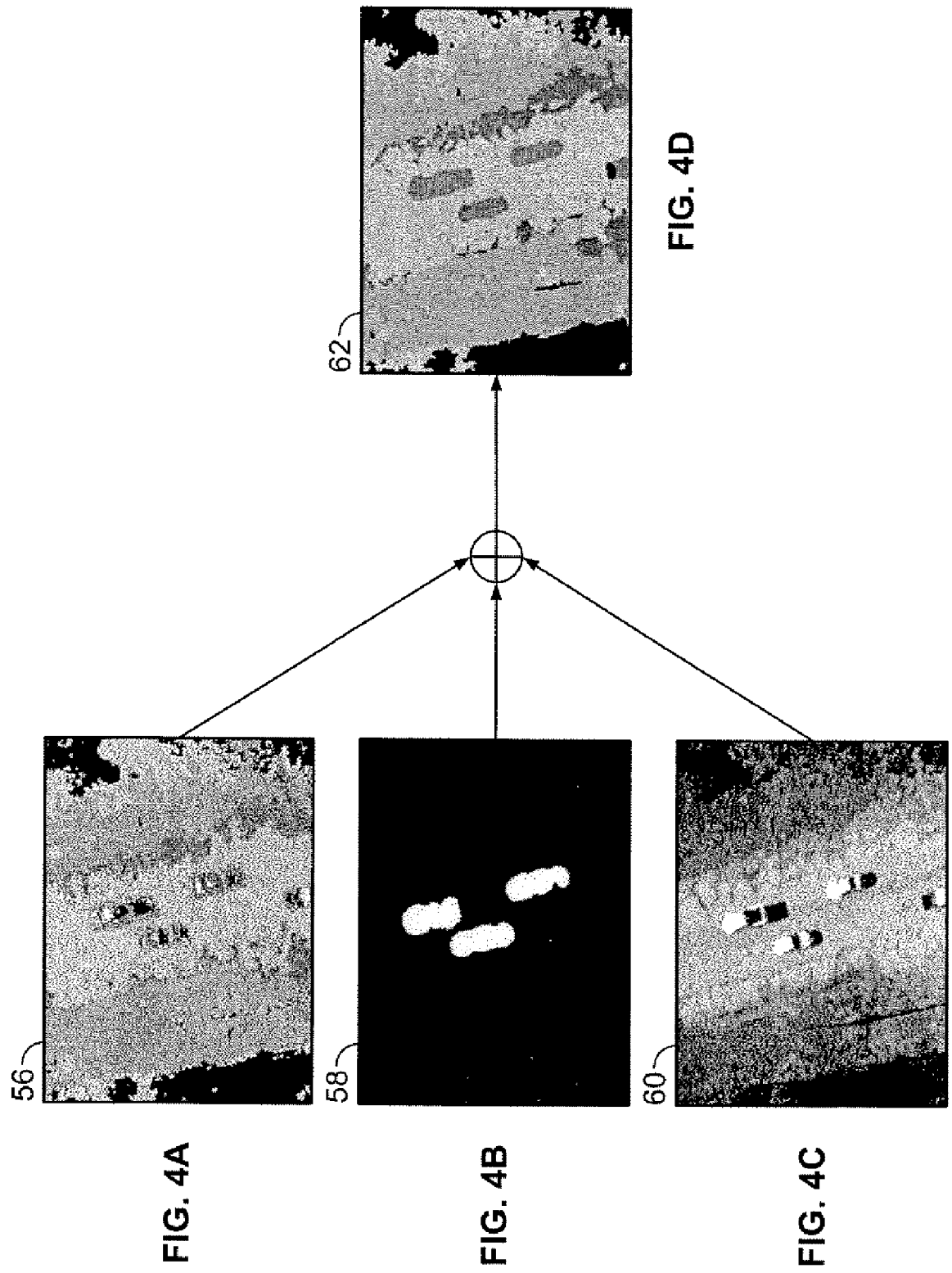

AUTOMATED VIDEO-TO-TEXT SYSTEM

CROSS-REFERENCE TO RELATED APPLICATIONS

This application claims the benefit of U.S. provisional patent application No. 60/793,044 filed Apr. 19, 2006, the disclosure of which is incorporated herein by reference in its entirety.

GOVERNMENT RIGHTS IN THIS INVENTION

This invention was made with U.S. government support under contract number HM1582-04-C-0010. The U.S. government has certain rights in this invention.

FIELD OF THE INVENTION

The present invention relates generally to vision systems, and more particularly to a system that automatically converts video to a stream of text which summarizes the video.

BACKGROUND OF THE INVENTION

There is a need to analyze large amounts of video that is captured daily by surveillance systems. This analysis was carried out in the past manually. Since the amount of video data can be large, it would be desirable to automate and speed-up the analysis process. Most existing approaches for video summarization in the prior art are designed for entertainment content where the video is generally scripted and edited to capture an audience's attention. In such circumstances, appearance and appearance changes that are easy to observe can be captured using simple tools, such as converting video content to histograms.

Surveillance video, however, especially aerial surveillance video, has fewer dramatic changes of appearance than entertainment video. Furthermore, surveillance video lacks predefined entities, such as shots, scenes, and other structural elements, such as dialogues, anchors, etc. Automated systems in the prior art for image/video understanding associate key words, especially nouns, with a video image. Unfortunately, systems that use noun-based annotations as key words are inherently incapable of capturing spatial and temporal interactions among semantic objects in a video.

Accordingly, what would be desirable, but has not yet been provided, is a system and method for effectively and automatically converting video to text and/or speech to summarize the video.

SUMMARY OF THE INVENTION

The above-described problems are addressed and a technical solution is achieved in the art by providing a method for converting a video to a text description, comprising the steps of receiving at least one frame of video; partitioning the at least one frame of a video into a plurality of blobs (i.e., regions and objects); providing a semantic class label for each blob; constructing a graph from a plurality of the semantic class labels representing blobs at the vertices and a plurality of edges represent the spatial interactions between blobs; and traversing the graph to generate a text description.

A Mixture-of-Expert blob segmentation algorithm is used to partition the at least one frame of a video into a plurality of blobs. The Mixture-of-Expert blob segmentation algorithm includes a Supervised Segmentation Expert, an Unsupervised Segmentation Expert, and a Moving Object Detection and Segmentation Expert. The Mixture-of-Experts blob segmentation algorithm processes the video data stream in parallel using the segmentation algorithms of the experts. The final results are computed by combining the segmentation results of all individual segmentation algorithms (experts). The algorithms are combined to maximize the segmentation accuracy and to mitigate limitations of each of the individual expert algorithms alone.

The resulting segmentation is coerced into a semantic concept graph based on domain knowledge and a semantic concept hierarchy. Then, the initial semantic concept graph is summarized and pruned. Finally, according to the summarized semantic concept graph and its changes over time, text and/or speech descriptions are automatically generated using one of the three description schemes: key-frame, key-object and key-change descriptions.

In the key frame description procedure (KFD), a mixed depth and breadth based description generation process is used that begins by selecting a seed node from the semantic concept graph. The seed node is the node with the highest cumulative importance and is described first. Subsequently, its neighbors are described in a depth first or breadth first fashion as dictated by their connectivity. The key object description procedure generates descriptions regarding only the key objects. It is used more frequently than the KFD but less so than the key change description procedure (KCD). The importance of each object is estimated according to a domain specific ontology and an operator behavior model. Then, at regular intervals, a few of the most important objects are selected and described in a similar fashion to the seed points of KFD. The key change description procedure (KCD) describes spatial and temporal changes related to key object. KCD detects and describes formation/deletion of nodes and links and detect and describes predefined events. Changing nodes and links in the semantic concept graph having an empirically determined importance above a predefined threshold are read out sequentially from the graph. The frequency of use of each of the description procedures is empirically determined.

BRIEF DESCRIPTION OF THE DRAWINGS

The present invention will be more readily understood from the detailed description of exemplary embodiments presented below considered in conjunction with the attached drawings, of which:

FIG. 2 is block diagram of software architecture associated with the automated-video-to-text/speech system of FIG. 1;

FIG. 3 is a block diagram of a Mixture of Experts (MoE) Blob Segmenter of FIG. 2;

FIG. 4A-4D are video frames that illustrate portions of the Mixture of Experts (MoE) Region and Object segmentation process of FIG. 3;

It is to be understood that the attached drawings are for purposes of illustrating the concepts of the invention and may not be to scale.

DETAILED DESCRIPTION OF THE INVENTION

Figure 1:
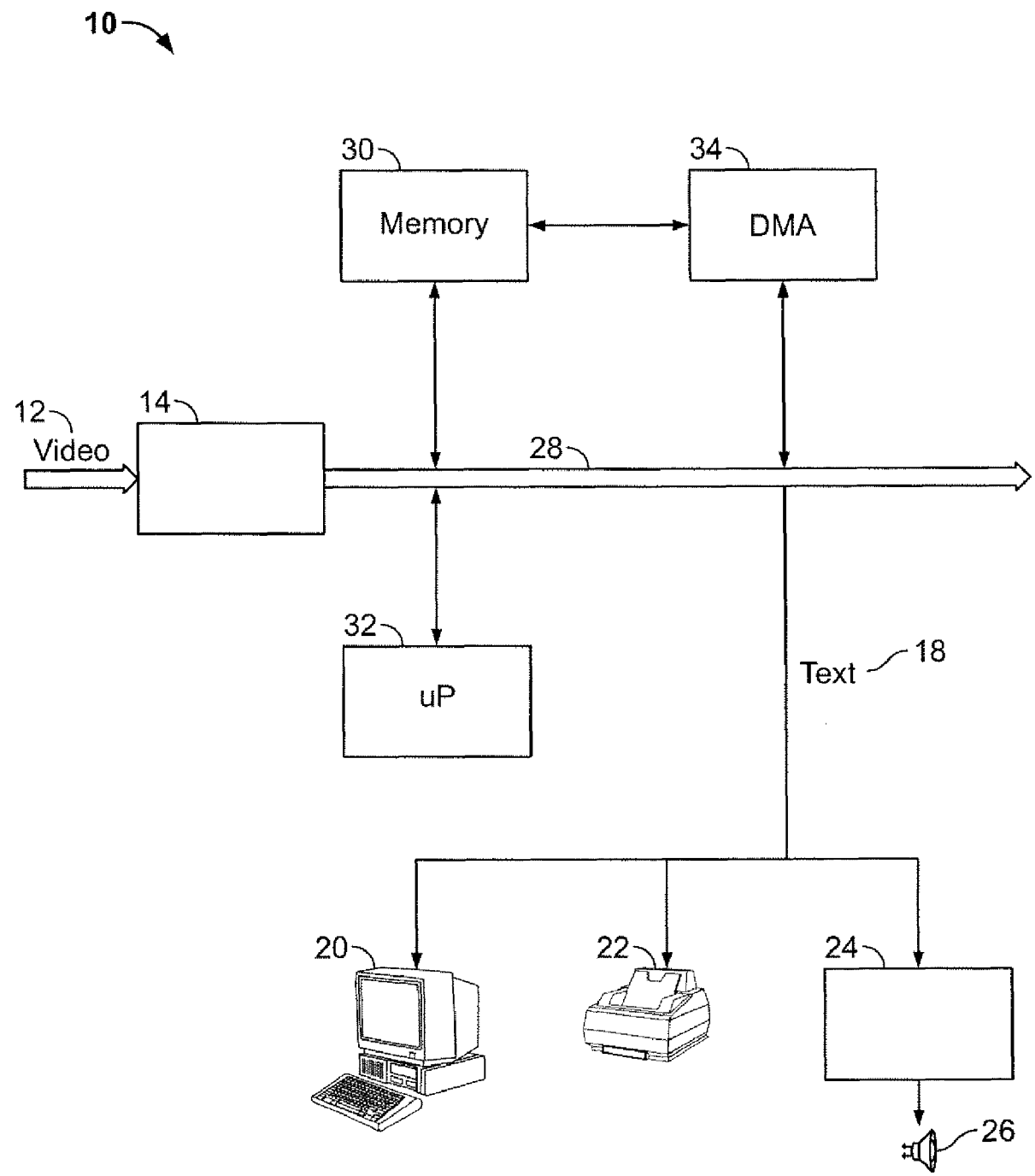
FIG. 1 is a block diagram of an automated video-to-text/ speech system, constructed in accordance with an embodiment of the present invention.

Referring now to FIG. 1, a block diagram of an automated video-to-text/speech system is depicted, generally indicated at 10. The system 10 receives digitized video 12, such as aerial video, via a computer-readable medium 14, which is fed to the system 10. The system 10 employs an automated video-to-text algorithm to be described below in connection with FIG. 2 to convert the video 12 to text 18. The text 18 is then fed by the system 10 to either a display 20, a printer 22, or converted to speech by a text-to-speech synthesizer 24, which outputs the converted text description through one or more speakers 26.

The system 10 further includes a bus system 28 which feeds data of the video stream 14 for receiving video data from the computer-readable medium 14. The bus system 28 passes the video stream to memory 30 by way of one or more processors 32 or directly via a DMA controller 34. The memory 30 can also be used for storing the instructions of the automated video-to-text/speech algorithm to be executed by the one or more processors 32. The memory 30 can include a combination of volatile memory, such as RAM memory, and non-volatile memory, such as flash memory, optical disk(s), and/or hard disk(s). The converted text data stream 18 can also be stored temporarily in the memory 30 for later output or fed in real time to the display 20, printer 22, and/or text-to-speech synthesizer 24. The processor-based system 16, which includes one or more processors 32, memory 30, and the optional DMA controller 34, can be incorporated into a personal computer, workstation, or an embedded system.

Referring now to FIG. 2, a block diagram of the automated-video-to-text software architecture 36 is depicted. The software architecture 36 includes a Mixture-of-Experts (MoE) Blob Segmenter module 38, a Dense Blob tracking module 40, a Blob Modeling Summarization module 42, a Text Description Generation module 44, and a Reasoning Engine 46. Inputs include the video datastream 14 and a Domain Knowledgebase/Ontology 48 database. The MoE Segmenter module 38 takes the video datastream 14 and extracts blobs for partitioning a scene into non-overlapping regions and objects with semantic meanings. As used herein, a blob, as is known in the art, refers to a region or object in a digital video image, i.e. a collection of contiguous pixels of interest. For example, if a circle is drawn around a set of pixels in a digital video image, then a blob is the set of connected components, i.e. pixels within that circle. The blobs extracted from the video datastream 14 are tracked using the Dense Blob Tracking module 40 to provide a global ID for each blob throughout the video. The Dense Blob Tracking module 40 also connects regions and objects in different frames into spatial and temporal coherent entities. After tracking, the blobs and their spatial interactions are represented in the Blob Modeling Summarization module 42 by a Semantic Connected Graph (SCG) to be described hereinbelow. In the SCG, the nodes of the graph represent blobs and the edges represent the spatial interactions between blobs. Examples of interactions include adjacencies, such as Blob A is adjacent to Blob B.

Since the MoE blob segmenter module 38 is designed to detect and classify all blobs in the video stream 14, the initial SGC is generally very complex, and hence a resulting text description would be complex. This problem is overcome in the Blob Modeling Summarization module 42 by a process of pruning using the Domain Knowledge/Ontology 48, a semantic concept hierarchy, and statistics of the interactions among blobs and semantic classes. After pruning, the SGC is used by the Text Description Generation module 44 to produce text descriptions using language generation techniques and an adaptive description schemes to be described hereinbelow for extracting the important interactions among regions and objects.

The MoE Segmenter module 38, the Dense Blob Tracking module 40, the Blob Modeling Summarization module 42, and the Text Description Generation module 44 are developed according to a priori knowledge and ontology specified by the application domain stored in the Domain Knowledgebase/Ontology 48. The Domain Knowledgebase/Ontology 48 captures constraints, context and common sense knowledge in the application domain. For example, if the input video data stream 14 is based on aerial surveillance video, then an a priori database of video surveillance blobs and interactions would be stored and recalled from the Domain Knowledgebase/Ontology 48. Based on the data stored in the Domain Knowledgebase/Ontology 48, the results of each processing module are verified using the Reasoning Engine 46. The Reasoning Engine 46 enforces contextual constraints. The Reasoning Engine 46 cross-validates the results computed from each of the first four modules in the context of the application domain. For example, the Reasoning Engine 46 would reject the possibility of a car disappearing in the middle of a road. In another example, if a region is detected as a building, the building ought to remain a building throughout the video if there is no dramatic change of appearance of the building, say, for example, if the building is destroyed.

Referring now to FIG. 3, the software architecture of MoE Segmenter module 38 is depicted. The MoE Segmenter module 38 includes a Supervised Segmentation Expert 50, an Unsupervised Segmentation Expert 52, and a Moving Object Detection and Segmentation Expert 54. The MoE Segmenter module 38 processes the video data stream 14 in parallel using the segmentation algorithms of the experts 50, 52, 54. The final results are computed by combining the segmentation results of all individual segmentation algorithms (experts) to be described hereinbelow. The algorithms are combined to maximize the segmentation accuracy and to mitigate limitations of each of the individual expert algorithms alone. Details on the mathematical/software implementation of expert algorithms can be found in Hui Cheng and Darren Butler, "Segmentation of Aerial Surveillance Video Using a Mixture of Experts," *Proc. of Digital Image Computing: Techniques and Applications (DICTA) Conference*, Cairns, Australia, December 2005, which is incorporated herein by reference in its entirety.

The Supervised Segmentation Expert 50 uses the Traninable Sequential Maximal a priori Estimation (TSMAP) sementation algorithm described in Hui Cheng and Charles A. Bouman, "Multiscale Bayseian Segmentation Using a Trainable Context Model," *IEEE Transactions on Image Processing*, April 2001, vol. 10, no. 4, pp. 511-525, which is incorporated herein by reference in its entirety. TSMAP is a multiscale Bayseian segmentation algorithm which can model complex aspects of both local and global contextual behavior. The model uses a Markov chain in scale to model class labels which form the segmentation, but augments the Markov chain structure by incorporating tree-based classifiers to model the transition probabilities between adjacent scales (Scales are subsampled images, with the finest scale being the original image). The wavelet coefficients at all scales are used as features for the data model. The Supervised Segmentation Expert 50 determines the semantic meaning of a blob. By training the (TSMAP) sementation algorithm to distinguish among a set of classes (regions or objects with semantic meaning, such as cars, building, trees), strong semantic meaning can be provided to a region or an object extracted by the MoE ROS algorithm. The output of the Supervised Segmentation Expert 50 is a (supervied) segmentation map which contains semantic class labels of all pixels of the original image.

The Unsupervised Segmentation Expert 52 uses the Mean Shift Segmentation Algorithm to impose spatial, color, and texture constraints on blob formation. The unsupervised region segmentation algorithms partition an image or video into regions based on their color, edge profile, and texture. This reduces noise and poor object boundaries that may be a side effect of using the Supervised Segmentation Expert 50 algorithm. The Mean Shift Segmentation Algorithm is described in D. Comaniciu and P. Meer, "Robust Analysis of Feature Spaces: Color Image Segmentation," in *Proc. of IEEE Conf. on Computer Vision and Pattern. Recognition*, San Juan, Puerto Rico, June 1997, pp. 750-755, and D. Comaniciu and P. Meer, "Mean shift: a robust approach toward feature space analysis," *IEEE Trans. on Pattern Analysis and Machine Intelligence*, vol. 24, no. 5, pp. 603-619, May 2002, which are incorporated herein by reference in their entirety.

The Mean Shift segmentation algorithm segments an image by building a feature palette comprising significant features extracted from a processing window. Significant features correspond to high-density regions in feature space. From a given starting point in feature space, the Mean Shift Segmentation Algorithm can be used to estimate a density gradient in order to find high-density regions (features). After the feature palette is computed, a feature is allocated to the closest entry in the palette and the index of the entry is designated as the semantic class label for the feature and the corresponding pixel location in the image. The output of the Mean Shift Segmentation Algorithm is a region map (unsupervised segmentation map) that partitions an image into non-overlapping regions (blobs).

The moving object Detection and Segmentation Expert 54 (algorithm) detects and segments moving objects. Motion is, by far, the most widely used and most reliable cue for object detection and segmentation. Motion is an effective cue for separating moving objects from their background. Using moving object detection, an image can be partitioned into regions (blobs) that move and regions (blobs) that do not move. A moving region is caused either by the movement of an object or by parallax effects caused by the movement of a camera. In some embodiments, global motion caused by the movement of an aerial platform and camera is used to register adjacent frames. Then, background modeling and change detection is applied. The background modeling and change detection algorithms used can be found in TaoZhao, Manoj Aggarwal, Rakesh Kumar, Harpreet S. Sawhney: "Real-Time Wide Area Multi-Camera Stereo Tracking," *CVPR* (1) 2005: 976-983, and Hai Tao, Harpreet S. Sawhney, Rakesh Kumar, "Object Tracking with Bayesian Estimation of Dynamic Layer Representations," *IEEE Trans. Pattern Anal. Mach. Intell.* 24(1): 75-89 (2002), which are incorporated herein by reference in their entirety. The output of the Detection and Segmentation expert 54 is a mask of moving and stationary blobs. In some embodiments, the mask can be a binary mask.

The final results of the MoE segmenter 38 are computed by combining the results of the experts 50, 52, 54 as follows:

Step 1. For each connected component in the unsupervised (region) segmentation map, a majority class (region/object label representing a blob) is computed from the corresponding supervised segmentation map. The majority class (semantic class label representing a blob) is assigned to all pixels of the connected component (blob) in the unsupervised region segmentation map. A connected component is defined herein, as is known in the art, as a set of pixels that are connected or associated with each other, i.e. contiguous pixels.

Step 2. For each connected component in the unsupervised (region) segmentation map, a majority class is computed (i.e. moving object or stationary object representing a blob) from the corresponding moving object detection binary mask. The majority class (i.e. moving object or stationary object semantic class label) is assigned to every pixel of the connected component in the unsupervised (region) segmentation map.

Step 3. The results computed in steps (1) and (2) are combined using reasoning based on the semantic meanings of the semantic class labels. When the semantic class labels from both results are consistent, the semantic class label computed in (1) is modified using the behavior, i.e. moving or stationary, computed from Step (2). For example, a car can be a moving object, but a road cannot. Whenever there is a conflict, such as a road is declared as a moving object, the confidence of both decisions are examined. If the confidence of the semantic class label is high and the confidence of the moving object detection is low, the semantic class label is chosen. For example, if there is higher confidence that an object is a road, even if it is declared as a moving road, it will be re-assigned as a stationary road. Otherwise, a search is conducted for the most likely semantic class label that is consistent with the results of the moving object detection. If there is tie, the blob is marked as "unknown."

Exemplary video frame output of the MoE segmenter 38 is shown in FIG. 4. Frame 56 shows an output frame after an input frame is run through the Supervised Segmentation Expert 50; frame 58 shows an output frame after an input frame is run through the Moving Object Detection and Segmentation Expert 54; frame 60 shows an output frame after an input frame is run through the Unsupervised Segmentation Expert 52; and frame 62 shows a frame after the results are combined for all the experts based on applying Steps 1-3 above.

After processing a video stream through the MoE Segmenter module 38, blobs are tracked using the Dense Blob tracking module 40 to generate correspondence among blobs in different frames. Instead of tracking only a small number of moving objects, the Dense Blob tracking module 40 partitions video frames into non-overlapping blobs. Objects may be tracked by the Dense Blob tracking module 40 using the dense blob tracking algorithm described in TaoZhao, Manoj Aggarwal, Rakesh Kumar, Harpreet S. Sawhney: Real-Time Wide Area Multi-Camera Stereo Tracking. *CVPR* (1) 2005: 976-983, which is incorporated herein by reference in its entirety. The output of the Dense Blob tracking module 40 is a global ID given to each unique blob (region or object) which is used throughout the video to identify a particular blob, e.g., for a semantic class label of a car, the global ID can be car number 24.

The aforementioned MoE Segmenter 38 partitions a scene into non-overlapping blobs (regions and objects) represented by semantic class labels. The semantic classes and locations of blobs obtained from the MoE blob segmenter 38 by themselves cannot fully portray the content of a video. For instance, knowing that two vehicles are present does not imply that they are moving or that one is following the other. In order to better understand what is unfolding and the reasons behind it, in addition to extracting blobs, it is desirable to ascertain the spatial, temporal and semantic relationships between them.

Figure 5:
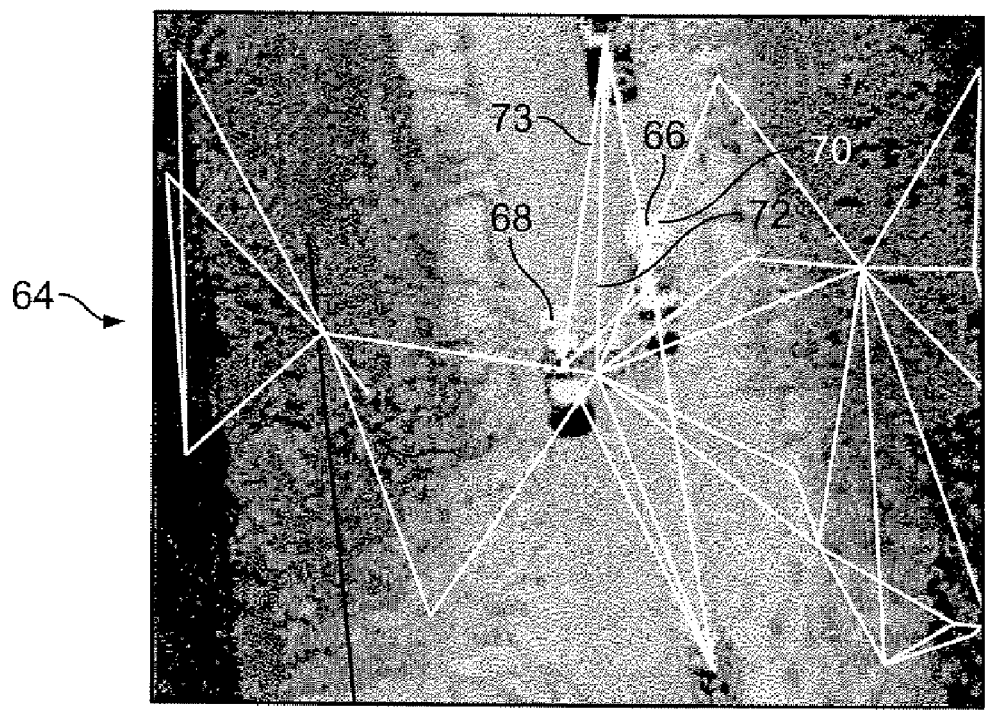
FIG. 5 is a detailed semantic concept graph (SCG), constructed in accordance with the embodiment of the present invention.

To further capture the spatial and temporal interaction of regions and objects, the Blob Modeling Summarization module 42 creates a graph representation of a scene. Referring now to FIG. 5, a graph 64 is constructed from regions 66 and objects 68 computed by the MoE segmenter 38, i.e. blobs 66, 68. The blobs 66, 68 and their spatial relationships are represented by a undirected graph 64, called semantic concept graph (SCG), where a vertex (node) 70 represents a blob and an edge 72 connects two blobs that are "adjacent." As referred to herein, "adjacent" represent a relationship of interest for a specific application, e.g., an adjacency defined as a function of class labels, time instant, and other domain specific context.

A consequence of using a semantic concept graph 64 with undirected edges 72 is that it is presumed that if object A is related to object B, then the converse is true: object B is related to object A. The initial semantic concept graph 64 is constructed as follows: first, a node 70 is created for every region (blob) (e.g. region 66) resulting from the MoE segmenter 38 output; then a count of the 4-connections (4 nearest square pixels immediately adjacent to a pixel of interest) between two region 66, 68 and another region 73 is computed. When the count is sufficiently high (i.e., when the count is greater than about 10 pixels), the regions 66, 68 are said to be adjacent and an edge 72 is formed between the corresponding nodes 66, 68. The resulting semantic concept graph 64 is representative of the spatial relationships between the regions.

In some embodiments, a blob 66, 68 has a unique id from the Dense Blob tracking module 40 and a semantic class label from the MoE segmenter 38. These attributes are augmented with physical attributes of blobs that are computed from metadata captured by, for example, an aerial platform. In particular, the ground sampling distance in meters per pixel is used to compute both the metric area of the blob 66, 68 and its velocity in meters per frame. Then, using physical attributes of the blob 66, 68, real-world knowledge about regions and objects can be imposed on the blob 66, 68 to validate or reject a blob's semantic class label. For example, a "person" that is the size of a building is indicative of an error by the MoE segmenter 38 and eliminated or labeled as "unknown".

The physical attributes of blobs 66, 68 are also fundamental for distinguishing between different specialties of a single class. For instance, a vehicle with a nonzero velocity has a different model than one that is parked and so is reclassified as the moving-vehicle class. Moving-vehicles can have different relationships and appear in different contexts (i.e. moving vehicles should appear on roads). Other blob specializations could include small, medium, large and oversize vehicle categories.

Given the above blob attributes, the spatial relationship among blobs 66, 68 can be further captured by defining whether two blobs 66, 68 are adjacent to each other or not. In some embodiments, adjacencies are considered to be class-to-class dependent. That is, two moving vehicles should be considered adjacent at a greater distance than two stationary vehicles. This is another way of stating that a moving vehicle has a greater "circle of influence" than one that is parked.

Adjacency can indicate whether two blobs 66, 68 are close to each other but may not capture the true semantics of the relationship between them. To overcome this potential problem, application dependent rules could be defined to allow the relationships between blobs 66, 68 to be specialized based on the mutual attributes of adjacent objects. Some rules for specializations for moving objects include the following:

Two adjacent vehicles that are moving in the same direction along the same trajectory are deemed to have a following relationship.

Two adjacent vehicles that are moving in the same direction along different trajectories are deemed to have an overtaking relationship.

Two adjacent vehicles that are moving in opposite directions along different trajectories are deemed to have a passing relationship.

Two adjacent vehicles that are moving in opposite directions along the same trajectory and closing on each other is an anomaly and is an indication that they are about to collide.

Referring again to FIG. 5, the initial SCG 64 models every detected blob 66, 68 and all of their relationships. Consequently, the initial SCG 64 can be too complex and too verbose to describe naturally. Therefore, the SCG 64 is summarized and pruned using application dependent rewrite rules whenever the loss of information is outweighed by the improved interpretability. The degree of summarization and the chosen rewrite rules can be tuned according to the specific application.

As mentioned above, the initial SCG 64 can be susceptible to misclassifications in the segmentation map. Fortunately, exploiting a priori knowledge and eliminating nodes that do not coincide with that knowledge can substantially reduce misclassification. For example, the size and shape of a car as seen by a aerial video is highly predictable given that the ground sampling distance is known. Therefore, any car nodes that do not coincide with the appearance of a car can be reclassified or otherwise eliminated. Describing every occurrence of a single class of object is also rarely beneficial. The amount of useful information that is lost by stating "there is a forest" as opposed to "there is a tree, near to a tree and another tree" is negligible. The same logic can be applied to groups of vehicles, buildings and people. However, the decision as to whether to summarize groups can be balanced against the loss of information to the application. Typically, much more information is lost when summarizing groups of people and cars than groups of trees. Another type of rewrite rule attempts to locate and replace patterns in the SCG 64. For instance, a group of vehicles following each other in single file can be summarized as a convoy. Similarly, a group of tanks that align themselves laterally are in echelon (attack) formation, which is a very useful pattern to detect.

Figure 6:
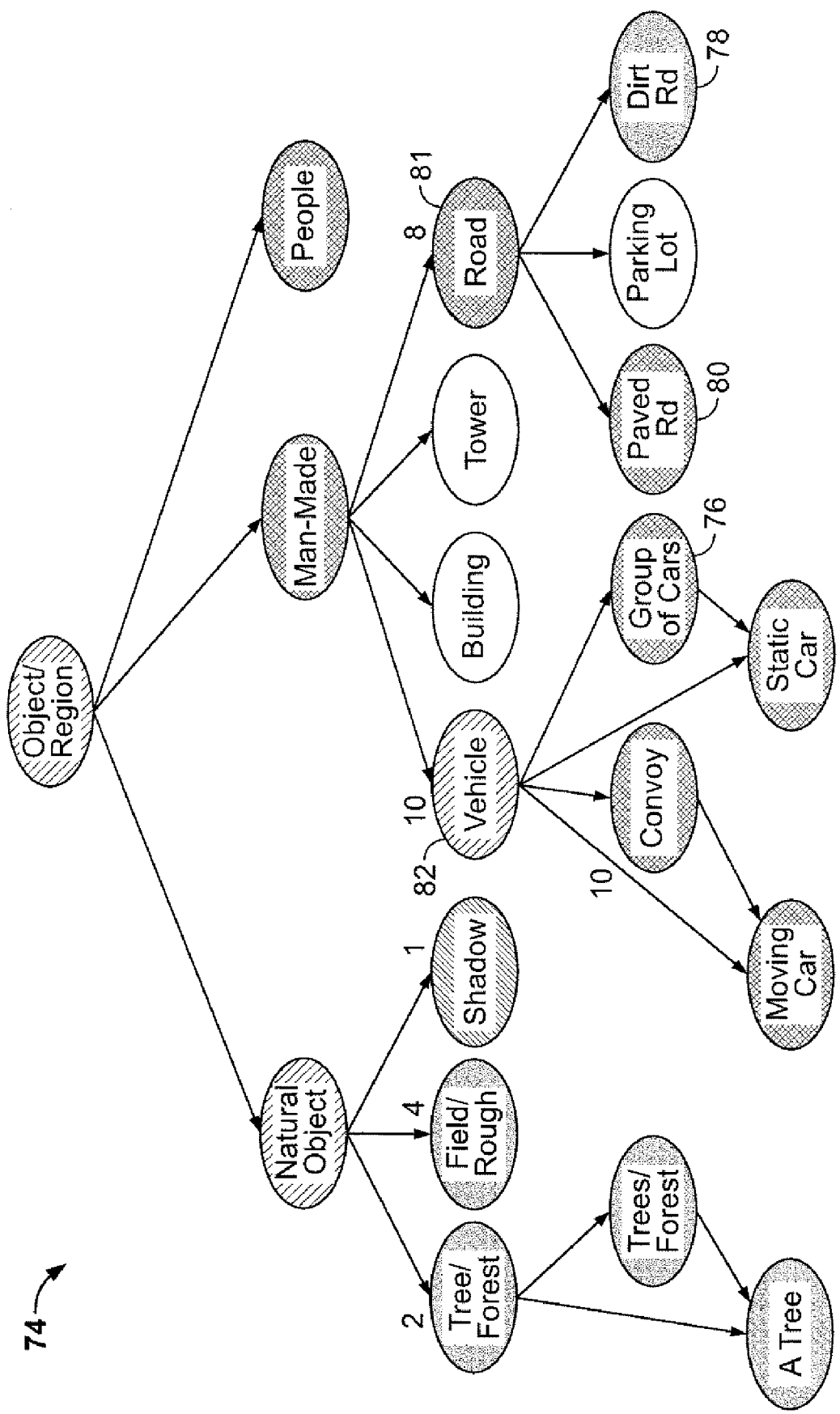
FIG. 6 is a graphical representation of class dependent tree constructed from the SGC of FIG. 5.

In addition to rewrite rules graph for SCG pruning and summarization, semantic classes (blobs) can be summarized when placed into a class-dependent tree that is itself pruned by applying the techniques described hereinbelow. Referring now to FIG. 6, graphical representation of class dependent tree constructed 74 from the SGC 64 is depicted. In the class dependent tree 74, objects or regions can be summarized to their common ancestor. For examples, a number of cars can be summarized to a group of cars 76. Dirt road 78 or paved road 80 can be summarized to road 81. In the tree of FIG. 6, a summarization loss is defined for each nearest summarization. The nearest summarization loss includes the summarization of a class to its parent, whereby a class is linked to the class to be summarized by a direct edge, e.g. tree/forest to natural object. Then a cost is computed for every summarization based both on the reduction of information given by the class dependent tree and cost of the scene description in number of words. When a verbose level is given, a final cost value (weight 82) is computed by combining the summarization cost and the description cost using a weigh that is a function of the verbose level. When the verbose level is high, weight for the scene description cost is low and the weight for summarization loss is high, therefore less summarization is preferred. When the verbose level is low, weight for the scene description cost is high and the weight for summarization loss is low, therefore more summarization is preferred.

Additionally, a set of rules is also used for graph pruning and summarization. These rules include the following:

1. Area Thresholding: by using knowledge of the ground sampling distance and the expected size and shape of objects, nodes that are most likely misclassifications can be deleted.
2. Shadow Elimination: shadows are of limited value in most applications and can be eliminated by interconnecting all of their neighbors and deleting the node. That is, if two nodes A and B are adjacent to the same shadow, an edge is formed between them and the shadow node is deleted.
3. Isolated Elimination: nodes that have no connections to other nodes are not likely to contribute to the understanding of the scene and can be removed from the graph.
4. Road Merging: it is rarely necessary to detail the exact type of each road segment. Consequently, it can be beneficial to merge connected road types (i.e. paved, dirt, etc.) into a single road type. This also helps to suppress misclassifications where cracks in a dirt road are classified as a paved road.
5. Field Merging: often when shadows are eliminated, separate field regions will become connected and in the same fashion as roads. These fields can be merged into a single field node.
6. Tree Summarization: if a fully connected sub-graph that only contains tree nodes is present and the cumulative tree area is suitably large, the sub-graph is replaced by a forest node.
7. Reclassify Moving: given that the globally motion compensated optical flow is available, vehicles can be reclassified as moving vehicles when their mean speed exceeds a threshold.
8. Moving Summarization: a group of three or more moving-vehicles connected by following edges can be supplanted by a convoy depending on their patterns of motion.
9. Similar to (8), if a fully connected sub-graph that only contains a single class of nodes is present, it can be replaced by a group-of node. For instance, three or more adjacent vehicles can be replaced by a group-of-vehicles node.
10. Importance Estimation: after summarization, the importance of each node can be estimated based on its class-dependent importance and the importance of the nodes with which it connects. Consequently, nodes that are heavily connected will become more important than nodes with few connections.

Figure 7:
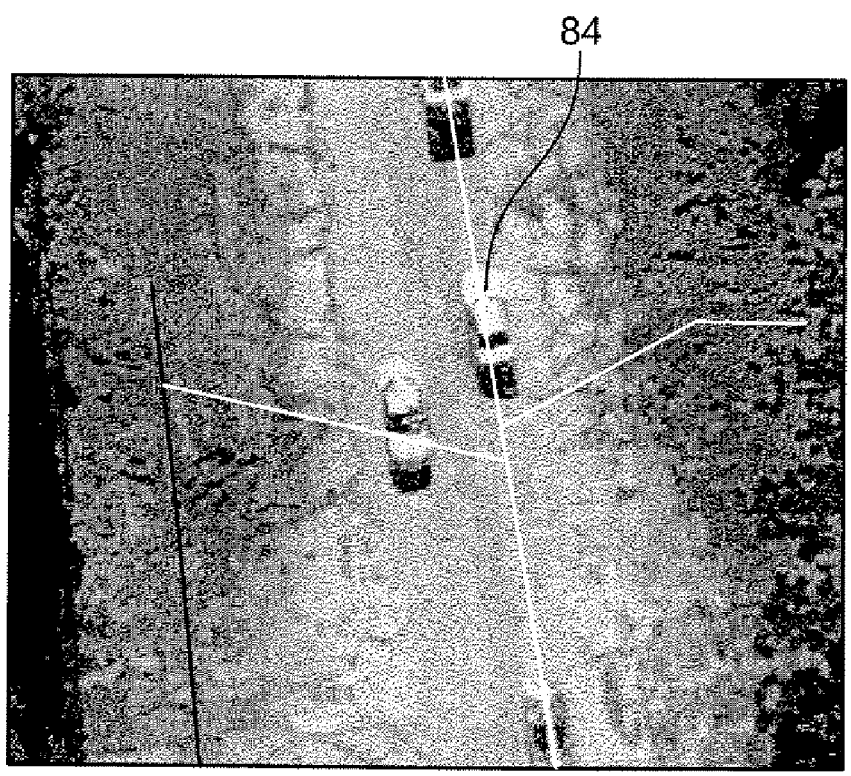
FIG. 7 is a summarized and pruned version of the SCG of FIG. 5.

Whenever a sub-graph is rewritten, it is stored as a child of the new node, thereby forming a semantic concept graph hierarchy. An example of a summarized and pruned SCG 84 is depicted in FIG. 7.

Events and anomalies can be detected as temporal changes in the summarized SCG 84 between frames or groups of frames. For instance, the addition of a new node indicates the appearance of new regions or objects and likewise, the absence of a node indicates that something has vanished. Changes in the blob model arise when an object changes state, such as when a vehicle starts or stops moving. For example, vehicles passing or overtaking each other can be detected through the addition or deletion of edges. When moving vehicles become near enough to each other, an edge can form between them. It is then a matter of determining whether the vehicles are moving in the same direction or opposite directions to determine if they are passing or overtaking one another. Other events, such as the formation of a convoy, cannot be detected by node or edge insertions and deletions. Instead these events are found by analyzing changes in the class of each node.

Based on the aforementioned caveats, an event detection algorithm that can be employed after obtaining the SCG 82 as follows:

(1) Detect node changes, including creation of new node, deletion of an existing node and change of property of an existing node (e.g. change of class label at an existing node, from car to moving car). Verify the node change is valid. If the change is valid, based on the importance of the node, create an event or an alert.

(2) Detect link change, including creation of new link, deletion of an existing link, and changes in properties of an existing link. Verify the link change is valid. If the change is valid, based on the importance of the node, create an event or an alert.

(3) Detect a predefined sub-graph, i.e. a graph representation of an event (e.g., a convoy is represented as a number of cars (nodes) following each other (edges between adjacent nodes) on a road (all car nodes also connected to the road node)) for known events and threats.

Some examples of events and anomalies that are detected by the above defined algorithm include a change of semantic class, the appearance of new nodes, and the addition of new "passing and overtaking edges." A change of semantic class for a given node is described if the change is consistent and important. For example, the case of change of semantic class from a vehicle-to-moving-vehicle implies the vehicle has started to move, but the case of vehicle-tree from adjacent frames indicates an error. An example of the appearance of anomalous new nodes can include "A new tree has appeared", and similarly, the disappearance of a node can include "A person has vanished." Such an anomalous event is not currently output by the system.

Figure 8:
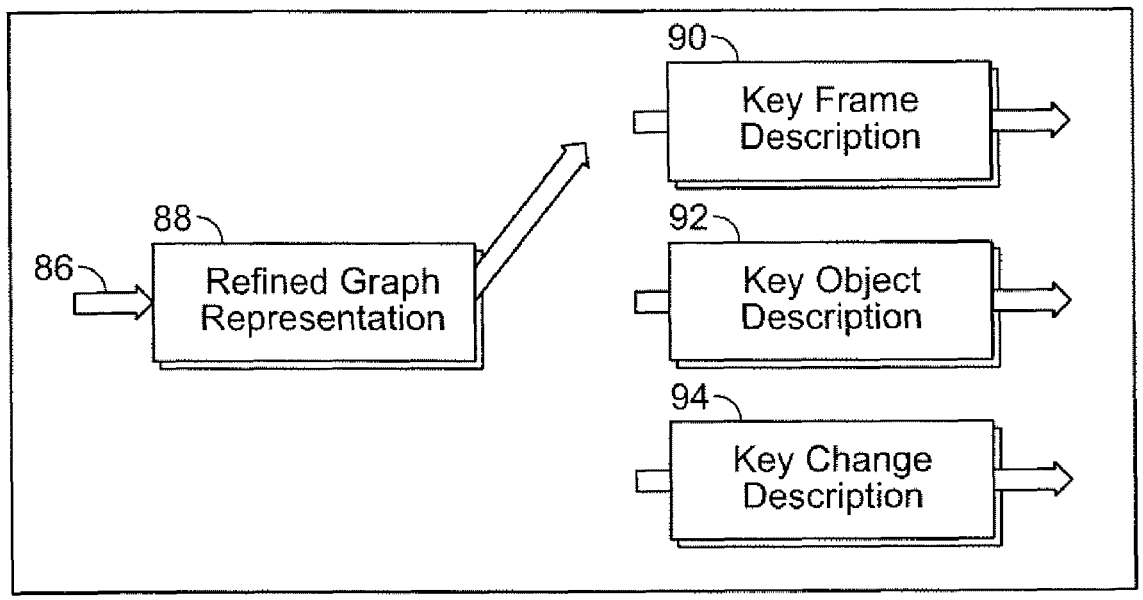
FIG. 8 is a block diagram of the Scene Description Generation procedure, constructed in accordance with the embodiment of the present invention.

Once the graph has been pruned and summarized to a desired level, text descriptions of the scene can be generated by traversing the SCG 82 using the Text Description Generation module 44. The Text Description Generation module 44 employs a Scene Description Generation procedure as depicted in FIG. 8. Using this procedure, a video 86 is described by a refined graph representation 88 embodied in an SGC. The SGC 88 can be passed to one of the three procedures, 90, 92, 94, in order to reduce redundancy and be adaptive to all type of contents. These procedures can include:

(1) a key frame description procedure 90;
(2) a key object description procedure 92; or
(3) an event/change description procedure 94.

Figure 9:
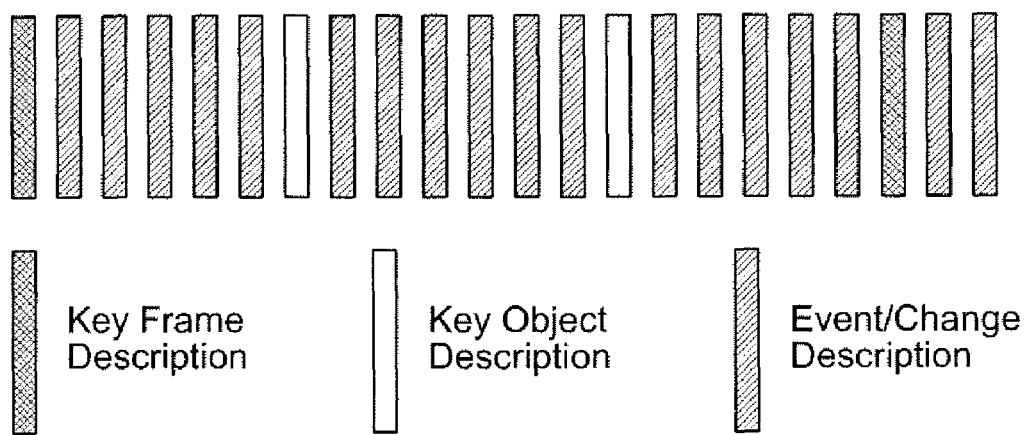
FIG. 9 is a graphical representation of the frequency of usage of the key frame description procedure (KFD), key object description procedure (KOD), and event/change description procedure used for generating text description from the SCG.

The key frame description procedure 90 gives the most detailed description of the scene, since it uses the largest number of words to describe a scene. Because of its verbosity, the key frame description procedure 90 is used the less often than the other description procedures. The key object description procedure 92 is often used between two key frames to repeat the behavior of key object. The event/change description procedure 94 is used to describe what is unfolding in the scene. Its usage depends on the time frequency of the events occurring in a video. The relative frequency of usage of each of the description procedures 90, 92, 94 is depicted graphically in FIG. 9. The relative frequency of use of the description procedures 90, 92, 94 is determined empirically.

The choice of application of one or another of the three description procedures 90, 92, 94 depends upon achieving a balance among similar conflicting objectives as embodied in the following four goals:

(1) minimizing the amount of text description;
(2) generating text descriptions as naturally as possible;
(3) providing random access; and
(4) maximizing the situational awareness of the user.

The output of the Text Description Generation Module 44 is a representation of a first-order system-generated summary for each video clip. In other words, the summary is represented as the concatenation of the key frame and key object descriptions of the clip as well as key change descriptions of successive frames.

The key frame description procedure (KFD) 90 generates sentences describing both regions (e.g. roads, fields, parking lots, etc) and objects (e.g. vehicles, people, buildings) as well as their current states and behaviors. A mixed depth and breadth based description generation process is used that begins by selecting a seed node. Each node in the pruned SCG 88 is initialized with an importance based on its semantic class which is then totaled with the importance of its children and that of its nearest neighbors. The seed node is the node with the highest cumulative importance and is described first using a sentence like "There is a Vehicle". Subsequently, its neighbors are described in a depth first or breadth first fashion as dictated by their connectivity. If the neighbor has less than five neighbors itself, then the most important branch is described (depth first), with a sentence like "and next to it there is a Dirt Road and next to it there is a Building" and so on. Conversely, if the neighbor has at least five neighbors, then each of them are described in succession (branch first) using "and next to it there is a Vehicle, a Road, another Vehicle and a Tree." At each node a decision is made as to which scheme to use according to the number of its neighbors. Therefore, it is possible to start with breadth first, then swap to branch first and back to breadth first. That is, the description adapts to the connectivity of the SCG 88. Once every node that can be reached from the seed has been described, a new seed node is chosen and the process is repeated until all nodes have been visited.

The key object description procedure (KOD) 92 generates descriptions regarding only the key objects. It is used more frequently than the KFD 90 but less so than the key change description procedure (KCD) 94. The importance of each object is estimated according to a domain specific ontology and the operator behavior model proposed in H. Cheng and J. Wus, "Adaptive Region of Interest Estimation for Aerial Surveillance Video," Proc. of International Conference on Image Processing, Genova, Italy, September 2005, which is incorporated herein by reference in its entirety. Then, at regular intervals, a few of the most important objects are selected and described in a similar fashion to the seed points of KFD. KOD is most useful for reaffirming to the operator/analyst that the status and actions of the key objects has not changed.

The key change description procedure (KCD) 94 describes spatial and temporal changes related to key objects, e.g. the creation or deletion of new objects, such as a vehicle passing another, turning off the road or stopping. KCD detects and describes formation/deletion of nodes and links and detect and describes predefined events as discussed above for detecting events. The key changes correspond to events of interest such as the appearance or disappearance of a car, a car driving off a road, etc. In the SCG 88, nodes and edges which exhibit events (appearances and disappearances) of a predetermined importance above a predefined threshold are read out from the SGC 88. Importance is defined empirically by an operator of the video equipment. For example, if an operator operating the controls of a surveillance camera is frequently following an object a certain number (predefined) of times per minute, then that object (blob) is assigned a high level of importance.

The present invention is subject to variations. The accuracy of the output of the system 10 can be improved even further by employing high-level scene description together with domain knowledge and common sense reasoning to detect and correct errors generated by segmentation, tracking, or other low-level processing. In particularly, a region/object behavior mode is developed to capture the common sense of how a region or object should be formed, should be observed, and should behave. For example, a new object or a new region is most likely to be observed starting from the border of a frame. Unless there is a dramatic change in color, shape and texture, a new object should not occur in the center of a frame. Two objects will merge only when they are observed to behave in a similar fashion and are adjacent to each other for a long time. Otherwise, their identities could be kept separately, etc.

The present invention has numerous advantages over prior art video-to-text systems. Important information, such as key frames, shots, scenes, and video objects can be extracted. With this information stored as metadata (text), events of interest can be detected automatically. Suspicious activities can be alerted by means of effective summarization, searching, browsing, and indexing based on content instead of solely on visual appearance. Ultimately, fewer people would be needed to analyze a large number of surveillance streams. Such a tool is also a form of compression which can reduce a video requiring kilo- or mega-bits per second to transmit into a text description that only requires kilo- or mega-bits per video to transmit.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for converting video to text, comprising the steps of:
   receiving at least one frame of video; partitioning the at least one frame of a video into a plurality of blobs;
   providing a semantic class label for each blob;
   constructing a graph from a plurality of the semantic class labels representing blobs at the vertices and a plurality of edges represent the spatial interactions between blobs; and
   traversing the graph to generate text associated with the video.

2. The method of claim 1, further comprising the step of processing the text description through a text-to-speech synthesizer to generate a speech version of the at least one frame of video.

3. The method of claim 1, wherein said step of partitioning the at least one frame of video into a plurality of blobs further comprises the steps of:
   (a) applying a trainable sequential maximal a priori estimator (TSMAP) to the at least one frame of video to generate a supervised segmentation map which contains semantic class labels of all of the pixels of the original image;

(b) applying the mean shift segmentation algorithm to the at least one frame of video to generate an unsupervised segmentation map of regions that partition an image into non-overlapping regions;

(c) detecting and segmenting moving objects to produce a moving object detection mask, the mask representing moving and stationary blobs; and (d) combining the maps generated in steps (a)-(c) to generate a plurality of semantic class labels representing the blobs contained in the at least one frame of video.

4. The method of claim 3, wherein said step of combining the maps generated in steps (a)-(c) comprises the steps of:

(e) computing a majority semantic class label from the supervised segmentation map for each blob in the unsupervised segmentation map;

(f) assigning the majority semantic class label computed in step (e) to all pixels of a blob in the unsupervised segmentation map;

(g) computing a majority semantic class label from the moving object detection mask for each blob in the unsupervised segmentation map;

(h) assigning the majority semantic class label computed in step (g) to all pixels of a blob in the unsupervised segmentation map; and (i) combining the majority semantic class labels assigned in steps (f) and (h) into a plurality of semantic class labels representing the blobs contained in the at least one frame of video using reasoning based on the semantic meanings of the class labels.

5. The method of claim 4, wherein said step of combining the majority semantic class labels of step (i) comprises the steps of:

(j) modifying the semantic class label from step (f) using the behavior, the behavior being one of moving and stationary, computed from step (h) when the semantic class labels from steps (f) and (h) are consistent; otherwise (k) choosing the semantic class label of step (e) when the confidence of the semantic class label computed is high and the confidence of the moving object detection step (g) is low; otherwise (l) conducting a search for the most likely semantic class label that is consistent with the results of the moving object detection step (g).

6. The method of claim 1, further comprising the steps of:
assigning each of the semantic class labels to a corresponding node of the graph;
computing a count of the 4-connections between nodes; and
forming an edge between two nodes when the count is above a predetermined number of pixels.

7. The method of claim 6, wherein the predetermined amount is about 10 pixels.

8. The method of claim 6, further comprising the steps of:
defining a summarization loss for each summarization of a semantic class label to its parent;
computing a summarization cost for every summarization based both on the reduction of information given by the class dependent tree and a description cost of a scene description in number of words;
computing a final cost value by combining the summarization cost and the description cost using a weigh that is a function of a verbose level; and summarizing the at least two semantic class labels to a parent node when the verbose level is low, the weight for the scene description cost is high, and the weight for summarization loss is low.

9. The method of claim 6, further comprising at least one of the following steps of:

deleting a node that is most likely to be misclassifications by using knowledge of a ground sampling distance and an expected size and shape of a blob;

eliminating shadows by interconnecting all of the shadow's neighbors and deleting the node representing the shadow; deleting nodes that has no connections;

merging connected road types into a single field node; replacing a fully-connected sub-graph of plurality of tree nodes with a forest node;

reclassifying a vehicle as a moving vehicle if its mean speed exceeds a predetermined threshold;

replacing a group of three or more moving-vehicles connected by "following" edges by a convoy; and replacing a fully-connected sub-graph of plurality of "X" nodes by a "group-of-X" node.

10. The method of claim 1, wherein the step of constructing a graph further comprises the steps:

placing the semantic class labels into a class-dependent tree; and summarizing at least two semantic class labels into a parent node.

11. The method of claim 1, wherein the step of traversing the graph further includes the step of employing one of a key frame description procedure, a key object description procedure, and an event/change description procedure.

12. The method of claim 11, wherein employing a key frame description procedure comprises the steps of:

(a) initializing each node of the graph with a measure of importance, the measure of importance being based on the semantic class type of the node totaled with the importance of the children of the node and that of its nearest neighbors;

(b) choosing a seed node, the seed node being the node with the highest cumulative importance;

(c) describing the seed node;

(d) describing the seed node's neighbors based on one of a depth first and breadth first fashion as dictated by the connectivity of the seed node, the neighbor nodes being described in a depth first fashion when the seed node has less than five neighbors itself, and the neighbor nodes being described in a branch first fashion when the seed node has at least five neighbors; and (e) once every node that can be reached from the seed node has been described, choosing a new seed node and repeating steps (a)-(e) until all nodes have been visited.

13. The method of claim 11, wherein employing a key object description procedure comprises the step of:

(a) initializing each node with a measure of importance, the measure of importance being based on a domain specific ontology and on operator behavior model;

(b) selecting the most important nodes as key nodes;

(c) selecting one of the key nodes as a seed node;

(d) describing the seed node;

(e) describing the seed node's neighbors based on one of a depth first and breadth first fashion as dictated by the connectivity of the seed node, the neighbor nodes being described in a depth first fashion when the seed node has less than five neighbors itself, and the neighbor nodes being described in a branch first fashion when the seed node has at least five neighbors; and (f) once every node that can be reached from the seed node has been described, choosing a new seed node and repeating steps (c)-(e) until all nodes have been visited.

14. The method of claim 11, wherein employing a event/change description procedure comprises the step of:

(a) initializing each node and edge representing an event of the graph with a measure of importance, an event being the appearance or disappearance of a node or edge, a high level of importance being an event occurring a predetermined number of times above a predetermined threshold defined by an operator of a video equipment; and (b) reading out important nodes and edges.

15. The method of claim 1, further including the step of detecting an event.

16. The method of claim 15, wherein the step of detecting an event further comprises the steps of:

detecting node changes including creation of a new node, deletion of an existing node, and changes in properties of an existing node;

verifying that the node change is valid; and creating an alert if the change is valid based on the importance of the node, wherein a node is considered important when it is tracked by an operator of video equipment a predetermined number of times within a predetermined time interval.

17. The method of claim 16, wherein the step of detecting an event further comprises the steps of:

detecting a link change, including creation of new link, deletion of an existing link, and changes in properties of an existing link;

verifying that the link change is valid; and creating an alert if the change is valid based on the importance of the link, wherein a link is considered important when it is tracked by an operator of video equipment a predetermined number of times within a predetermined time interval.

18. The method of claim 16, wherein the step of detecting an event further comprises the steps of: detecting a predefined sub-graph of the graph for known events and threats.

19. An apparatus for converting a video to a text description, comprising:

a receiver for receiving at least one frame of video;

a segmenter module for partitioning said at least one frame of video into a plurality of blobs and for providing a semantic class label for each of said blobs;

a tracking module for providing a global identifier for each of said blobs;

a summarization module for constructing a graph from a plurality of semantic class labels representing said blobs at the vertices and a plurality of edges representing the spatial interactions between said blobs; and a description generation module for traversing the graph to generate text associated with the video.

20. The apparatus of claim 19, further comprising a text-to-speech synthesizer for generating a speech version of said at least one frame of video.

21. The apparatus of claim 19, further comprising a domain knowledgebase/ontology for capturing constraints, context, and common sense knowledge in an application domain.

22. The apparatus of claim 21, further comprising a reasoning engine for enforcing contextual constraints and for cross-validates the results computed from said mixture-of-experts segmenter module, said dense blob tracking module, said blob modeling summarization module, and said blob modeling summarization module in the context of said application domain.

23. A non-transitory computer-readable medium carrying one or more sequences of instructions for converting video to text, wherein execution of the one of more sequences of instructions by one or more processors causes the one or more processors to perform the steps of:

receiving at least one frame of video;

partitioning the at least one frame of a video into a plurality of blobs;

providing a semantic class label for each blob;

constructing a graph from a plurality of the semantic class labels representing blobs at the vertices and a plurality of edges represent the spatial interactions between blobs; and traversing the graph to generate text associated with the video.

24. The non-transitory computer-readable medium of claim 23, further comprising the step of processing the text description through a text-to-speech synthesizer to generate a speech version of the at least one frame of video.

* * * * *